(12) United States Patent
Sudau (10) Patent No.: US 7,104,376 B2
(45) Date of Patent: Sep. 12, 2006

(54) CLUTCH ARRANGEMENT

(75) Inventor: Jörg Sudau, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 103 days.

(21) Appl. No.: 10/492,892

(22) PCT Filed: Aug. 6, 2002

(86) PCT No.: PCT/EP02/08753

§ 371 (c)(1),
(2), (4) Date: Apr. 16, 2004

(87) PCT Pub. No.: WO03/036118

PCT Pub. Date: May 1, 2003

(65) Prior Publication Data

US 2004/0245062 A1    Dec. 9, 2004

(30) Foreign Application Priority Data

Oct. 19, 2001   (DE)   ............... 101 51 632

(51) Int. Cl.
*F16D 25/0638*   (2006.01)
*F16D 13/72*   (2006.01)
(52) U.S. Cl. ................. 192/70.12; 192/91 A; 192/82 T
(58) Field of Classification Search ..................... None
See application file for complete search history.

(56) References Cited

U.S. PATENT DOCUMENTS

| | | | |
|---|---|---|---|
| 2,879,871 A * | 3/1959 | Van Ranst ............... 192/104 R |
| 3,145,816 A * | 8/1964 | De Lorean et al. ....... 192/91 R |
| 4,009,771 A * | 3/1977 | Crankshaw ............. 192/105 A |
| 4,238,017 A | 12/1980 | Spokas | |
| 4,724,942 A | 2/1988 | Casse et al. | |
| 4,828,089 A * | 5/1989 | Collins et al. ............ 192/70.12 |
| 5,261,517 A * | 11/1993 | Hering ..................... 192/91 A |
| 5,638,932 A * | 6/1997 | Mizukami ................ 192/70.12 |
| 5,682,971 A * | 11/1997 | Takakura et al. ....... 192/107 R |
| 5,810,142 A | 9/1998 | Schaefer | |
| 5,967,285 A * | 10/1999 | Mohan et al. ........... 192/103 F |
| 6,062,367 A | 5/2000 | Hirayanagi et al. | |
| 6,910,561 B1 * | 6/2005 | Sasse ..................... 192/70.12 |

FOREIGN PATENT DOCUMENTS

| | | |
|---|---|---|
| DE | 819 186 | 10/1951 |
| DE | 100 60 684 | 6/2002 |
| GB | 2 010 422 | 6/1979 |

* cited by examiner

*Primary Examiner*—Richard M. Lorence
(74) *Attorney, Agent, or Firm*—Cohen, Pontani, Lieberman & Pavane (57) ABSTRACT

The invention relates to a clutch arrangement, in particular for a motor vehicle, comprising a housing arrangement which is filled or can be filled with fluid, at least one first friction member which is coupled with the housing arrangement for commonly rotating, at least one second friction member which is coupled or can be coupled with a driven shaft for commonly rotating, a fluid supply area for introducing fluid into a delimited area of said housing arrangement, in which the first and second friction members operate, a fluid discharge area for evacuating the fluid from the delimited area, as well as an energy accumulator, by means of which the first and second friction members are prestressed in friction interaction.

9 Claims, 7 Drawing Sheets

CLUTCH ARRANGEMENT

CROSS-REFERENCE TO RELATED APPLICATIONS

This is a U.S. national stage of application No. PCT/EP02/08753, filed on 6 Aug. 2002. Priority under 35 U.S.C. §119(a) and 35 U.S.C. §365(b) is claimed from German Application No. 101 51 632.0, filed 19 Oct. 2001.

BACKGROUND OF THE INVENTION

1. Field of the Invention

The present invention pertains to a clutch arrangement, especially for a motor vehicle, comprising a housing arrangement which is or can be filled with fluid, in which friction elements which are or can be connected to the housing arrangement for rotation in common and friction elements which are or can be connected to a takeoff shaft can be brought into frictional interaction with each other.

2. Description of the Related Art

In clutch arrangements of this type, which are also known as wet-running clutches, several fluid flow areas are usually provided, through which the fluid which flows around and thus cools the areas which become frictionally active and the fluid responsible for the clutch-engaging and clutch-disengaging operations are supplied and removed. This means that various flow routes must be kept available, which often leads to a complicated design and also to the need for complicated sealing measures. In addition, a design in which both the cooling action and the actuating function are accomplished in the form of a so-called 3-line system, for example, also requires the availability of an appropriate pump arrangement in a gearbox, which is able to provide the necessary quantity of oil used as the working fluid.

SUMMARY OF THE INVENTION

The task of the present invention is to make available a clutch arrangement in which, although simple in design, nevertheless can ensure sufficient cooling of the frictionally active areas.

According to the present invention, this task is accomplished by a clutch arrangement, especially for a motor vehicle, comprising a housing arrangement, which is or can be filled with fluid; at least one first friction element, which is connected to the housing arrangement for rotation in common; at least one second friction element, which is or can be connected to a takeoff shaft for rotation in common; a fluid feed area for the introduction of fluid into a space of the housing arrangement in which the first and second friction elements are active; a fluid removal area for the discharge of fluid from the space; and a energy-storage device, by means of which the first and second friction elements are pretensioned into frictional interaction.

In the clutch arrangement designed according to the invention, therefore, adequate cooling is ensured by the flow of working fluid through the space which contains the surfaces which become frictionally active. The clutch is actuated, however, in the manner of a dry friction clutch of conventional design, in which the clutch-engaging force is produced by an energy-storage device. It is thus possible to eliminate one of the fluid feed lines inside the clutch, namely, the line through which the fluid responsible for the engaging and disengaging operations is supplied and which would otherwise have to be present in addition to the lines used for the fluid exchange.

In the inventive clutch arrangement, it is then possible to provide an actuating arrangement essentially outside the housing arrangement, by means of which the energy-storage device can be actuated to perform the clutch-release operation. This ultimately means that, in the inventive design of the clutch arrangement, a wet-running clutch is combined with a conventional clutch-release system, such as that which can be used in dry friction clutches.

So that the force can be transmitted from the energy-storage device to the friction elements provided in the fluid-filled housing, a ring-like actuating element can be provided, which can slide in an essentially fluid-tight manner on the housing arrangement to transmit the pretensioning action between the energy-storage device and the friction elements, the pretensioning action of the energy-storage device being transmitted by a plurality of force-transmitting sections passing through the housing arrangement.

In an alternative embodiment of the clutch arrangement according to the invention, it is possible for the pretensioning action of the energy-storage device to be at least partially nullified by an increase in the fluid pressure in the space. An additional fluid line for the engaging and disengaging operations can therefore also be omitted in a design of this type. The force acting in opposition to the pretensioning action is produced instead by the application of the appropriate pressure to the space which contains the frictionally active areas.

For example, an actuating element which forms at least part of the boundary of the space and which transmits the pretensioning action between the energy-storage device and the friction elements can be provided, which actuating element can be shifted against the pretensioning action of the energy-storage device by an increase in the pressure in the space for the purpose of at least partially nullifying the force being exerted on the friction elements.

So that the occurrence of tilting moments which could possibly impair the functionality of the clutch arrangement can be prevented, it is proposed that the energy-storage device be located in the housing arrangement and that it preferably act on the radial area of the actuating element which acts on the friction elements.

In accordance with another aspect of the present invention, the invention provides a clutch arrangement, wherein at least one of the friction elements is designed to produce a fluid circulation flowing around at least some of the frictionally actuated areas of the friction elements, and where a first space of the housing arrangement, in which the friction elements are active, is essentially sealed off against fluid exchange. The arrangement also comprises an actuating element, which can be actuated by the supply of fluid to a second space to produce frictional interaction between the friction elements. When the friction elements are interacting frictionally with each other essentially without slip and a temperature in the area of the clutch arrangement exceeds a predetermined limit, the friction elements are brought into a state of slippage. Alternatively or additionally when a temperature in the area of the clutch arrangement is above a predetermined limit, the clutch arrangement is prevented from engaging and thus from creating a slip-free state.

The number of required fluid lines can also be reduced in a design of this type as well, because no fluid lines are required for the fluid exchange in the space in which the frictionally active surfaces are located. The cooling action is produced by the fluid circulation induced in this space itself. If, for example, it has been found that, after the clutch has been fully engaged and a slip-free state has been produced, i.e., a state in which the input rpm's are the same as the output rpm's, too much heat has accumulated as a result of the previous sliding friction work, a state in which a small amount of slip is present can be produced at least temporarily. When the clutch therefore starts to slip again, the difference in the rpm's between the input and output sides will then ensure that the fluid will start to circulate, which will very quickly carry away the previously generated heat from the critical areas.

To be able to produce this fluid circulation, it is possible, for example, to provide a fluid transport surface area for producing fluid circulation on at least one of the friction elements. It should be noted that a fluid transport surface area is provided preferably on at least one first friction element and on at least one second friction element. These fluid transport areas will then, in the manner of a pump wheel/turbine wheel effect as is known from torque converters or fluid clutches, cause the fluid to circulate around the frictionally active surface areas and possibly also allow it to transmit a certain amount of torque.

In accordance with another advantageous aspect, the present invention provides a clutch arrangement, especially for a motor vehicle, wherein at least one of the friction elements is designed to produce a fluid circulation which flows around at least some of the frictionally actuated areas of the friction elements. The arrangement also comprises a fluid feed area for introducing fluid into the space of the housing arrangement in which the first and second friction elements are active; and a fluid discharge area for removing fluid from the space, wherein fluid can be introduced through the fluid feed area into an axial area of the space in which the fluid circulation has a radially outward-directed flow component. Alternatively or additionally, fluid can be removed through the fluid discharge area from an axial area of the space in which the fluid circulation has a radially inward-directed flow component.

Because the fluid is supplied to and removed effectively from the areas in which the circulation is already flowing in a radially outward or radially inward direction, the fluid feed or fluid discharge cannot interfere with the fluid circulation or with the buildup of the circulation which is present essentially only in the area of the frictionally active sections. In fact, the feed or discharge of the fluid can even support such circulation.

An arrangement of this type is especially advantageous in cases where the fluid feed area and/or the fluid discharge area is provided in an area radially inside the frictionally active areas of the friction elements.

So that the previously mentioned supportive effect can be achieved in particular as a function of the group of friction elements which is rotating faster than the other while the clutch is slipping, that is, as a function of whether the entire system is in an operative state of pushing or pulling, it is proposed that two axially offset fluid inlet/outlet areas be provided, each of which can be used as desired as a fluid feed area or as a fluid discharge area.

The effect of supporting the fluid circulation by the effective feed or discharge of fluid can be accomplished very effectively by locating at least one of the fluid feed/discharge areas axially in an area in which a friction element designed to produce fluid circulation is present. It is obvious that an exact axial alignment is not necessary here, although it would be advantageous.

In the inventive design described above, it is preferable for this fluid inlet/outlet area to be used as a fluid feed area when the fluid circulation-producing friction element located in the axial area of a fluid inlet/outlet area is one of the components turning at higher rpm's when the clutch is slipping, and/or for this fluid inlet/outlet area to be used as a fluid discharge area when the fluid circulation-producing friction element located in the axial area of a fluid inlet/outlet area is one of the components turning at lower rpm's when the clutch is slipping.

The present invention is described in detail below with reference to the attached drawings on the basis of preferred exemplary embodiments:

DETAILED DESCRIPTION OF THE PRESENTLY PREFERRED EMBODIMENTS

Figure 1:
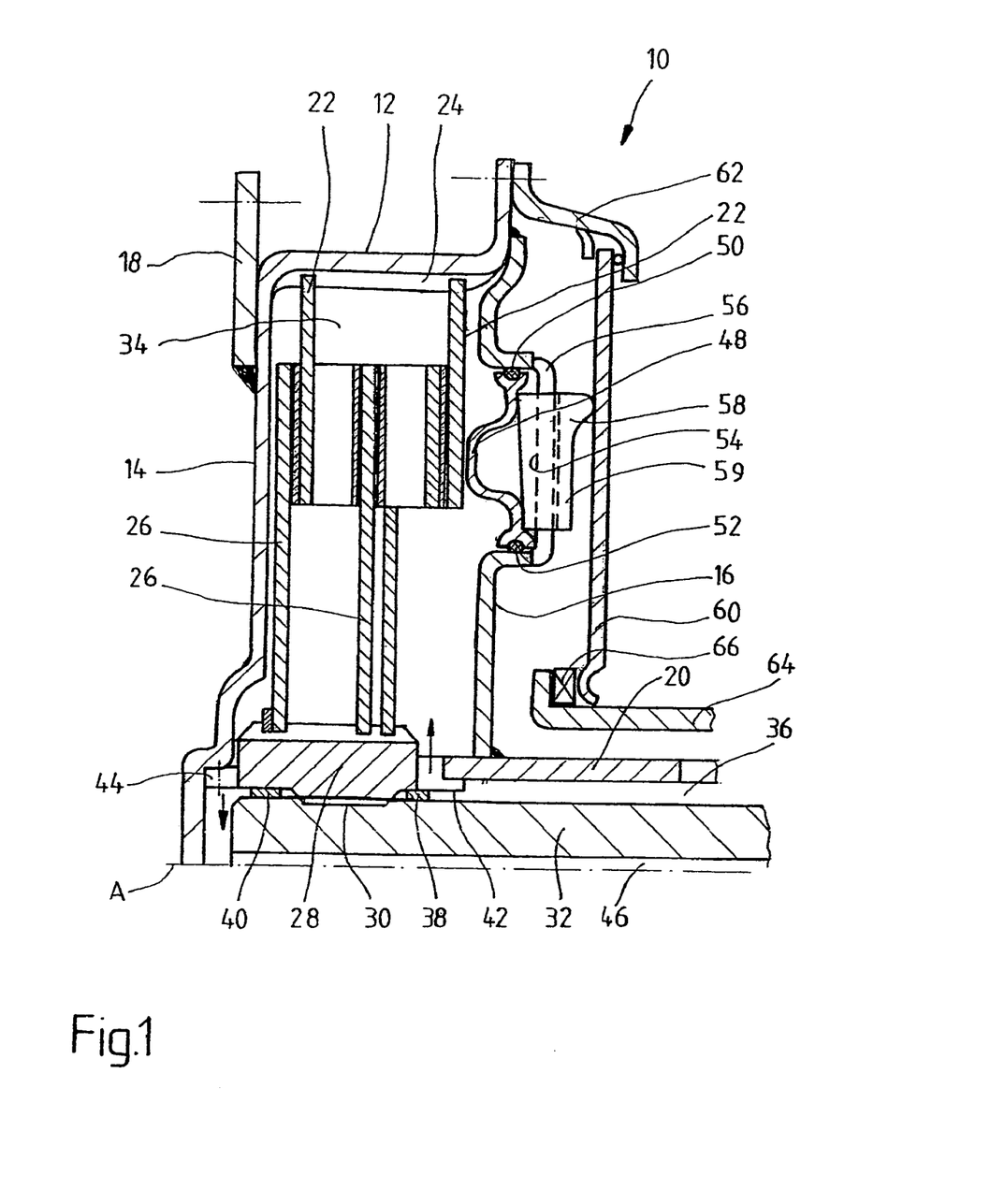
FIG. 1 shows a partial longitudinal cross section through a first embodiment of a clutch arrangement according to the invention.

FIG. 1 shows a clutch arrangement 10 including a housing arrangement 12 with a first housing part 14 in the form of a cup, which is to be positioned facing drive unit, and a second housing part 16, which is to be positioned near a gearbox. Various connecting elements 18 can be used to connect the housing part 14 to the drive shaft for rotation in common. The second housing part 16 is permanently connected in its radially inner area to a housing hub 20, also called the pump hub. This pump hub fits into a gearbox, where it drives a fluid pump, which delivers the fluid. Disks 22, serving as first friction elements, are provided in the housing arrangement 12; the radially outer part of these disks engages for rotation in common with the housing 12, which is provided with teeth 24, for example, which allow the disks to shift axially with respect to the housing arrangement 12. In addition, the disks 26 are provided as second friction elements, the radially inner areas of which are connected nonrotatably but with freedom of axial movement to a takeoff hub 28. In the areas which overlap each other in the circumferential direction, the disks 22, 26 can be brought into frictional contact with each other to produce a torque-transmitting connection between the housing arrangement 12 and the takeoff shaft 32, which can be connected for rotation in common with the takeoff hub 28 by means of a set of wedge-shaped teeth 30. For this purpose, at least some of the disks 22, 26 can be equipped with friction linings or corresponding friction-enhancing surface coatings.

The interior space 34 of the housing arrangement 12, in which the corresponding surface areas of the disks 22, 26 can make frictional contact with each other, is filled at least partially with a working fluid, such as oil drawn from the gearbox, at least during the time that the vehicle is being driven. The fluid can be drawn through an intermediate space 36, which is formed between the housing hub 20, designed as a hollow shaft, and the takeoff shaft 32, which is usually a gearbox input shaft. The fluid thus arrives in the interior space 34. To ensure defined flow relationships here, sealing elements 38, 40 can be located operatively between the takeoff shaft 32 and the takeoff hub 28. A support element 42 provided for the axial support of the takeoff hub 28 on the side near the gearbox can have pass-through areas at various circumferential points to allow the passage of the fluid arriving via the intermediate space 36. On the other axial side, the takeoff hub 28 is supported axially by a bearing element 44 against the housing arrangement 12. It should be noted here that the bearing elements 42, 44 can be designed as plain bearing elements, for example. The bearing element 44 also has pass-through areas at various circumferential points, through which the fluid leaving the interior space 34 can flow radially inward, so that it can then be drawn off through a central opening 46 in the takeoff shaft 32 and conveyed back to, for example, the gearbox. It should be pointed out at this early point that the direction in which the fluid flows can also be the opposite of that described here. As will be described in detail below, the flow direction can be made to depend on whether the clutch arrangement 10—especially when it is working in a state of slippage—is operating in pull mode, that is, a state in which torque is being transmitted from the prime mover to the takeoff shaft 32, or whether it is working in push mode, that is, a state in which torque is being transmitted from the take-off shaft 32 to the prime mover, which can be the case, for example, when the engine is being used as a brake.

To achieve the previously described frictional interaction, an actuating piston 48 in the form of, for example, a ring, is provided in the housing arrangement 12. The housing part 16 has a cup-like recess 54, which is assigned to this actuating piston 48 and which passes around the axis of rotation A in a ring-like manner. The radially inner and radially outer parts of the actuating piston 48 slide in a fluid-tight manner in the direction parallel to the axis of rotation A with the help of intermediate sealing elements 50, 52. At several points around the circumference, the previously mentioned ring-like recess 54 in the housing part 16 is provided with openings 56. A force-transmitting element 58 passes through each of these openings 56. These force-transmitting elements are supported on one side against the actuating piston 48, and on the other side they are under the influence of an energy-storage device 60, designed, for example, as a diaphragm spring or plate spring. The individual actuating elements 58 can be connected integrally to each other by a ring-like circumferential area 59, situated outside the housing arrangement 12. The energy-storage device 60 is supported radially on the outside against a support element 62, permanently connected to, for example, the housing part 14, and its radially central area acts on the force-transmitting elements 58. An actuating mechanism 64, indicated here only schematically, acts on the radially inner area of this energy-storage device 60 by way of a rotational disconnect bearing 66. This actuating mechanism 64 can be designed in the same way as a clutch-release mechanism suitable for use in a dry friction clutch. Thus, conventional release forks, master/slave cylinder systems, spindle drives, etc., can be used.

As a result of the pretensioning force of the energy-storage device 60, the actuating piston 48 is pressed via the force-transmitting elements 58 against the disks 22, 26. The disks 22, 26 are also pressed against each other, and the axial side of one of them which faces away from the actuating piston 48 is pressed against the housing arrangement 12. In this way, the engaged state of the clutch is produced. To change back to an at least partially disengaged state in the example shown here, a pulling force can be exerted on the radially inner part of the energy-storage device 60 in order to nullify or at least partially to reduce the actuating effect.

In the system shown in FIG. 1, it is not necessary to supply hydraulic fluid to perform engaging or disengaging operations, which means that no special channel arrangement is needed for this purpose. This simplifies the design of the clutch arrangement according to the invention.

Figure 2:
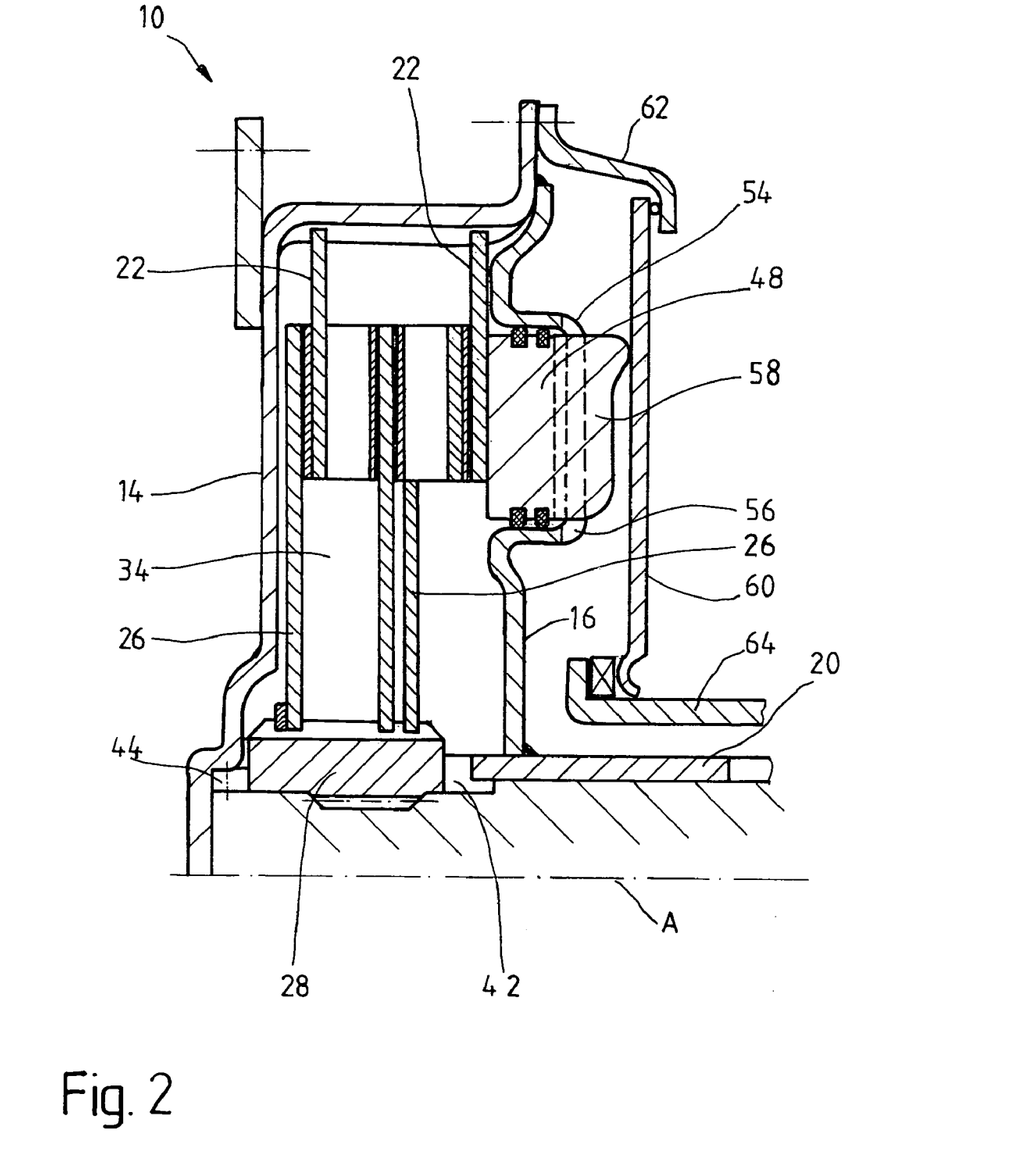
FIG. 2 shows a view, corresponding to FIG. 1, of a modification of the first embodiment.

FIG. 2 shows a modification of the clutch arrangement 10 shown in FIG. 1. Only the differences in the design will be discussed in the following.

It can be seen here that the actuating piston 48 carries the force-transmitting elements 58 as integral components. Whereas, therefore, in the embodiment according to FIG. 1, the actuating piston 48 can be formed out of a metal plate blank, for example, and recesses can be produced in the radially inner and outer areas to hold the sealing elements, the actuating piston 48 shown in FIG. 2 can be produced by a casting process and/or a machining process. An advantage of the actuating piston 48 of FIG. 2 is that, as a result of the integration of the piston and the force-transmitting elements 58, a connection with the housing part 16 for rotation in common can be provided at the same time. To achieve this in the embodiment according to FIG. 1, the separately made actuating elements 58 would have to be permanently bonded or welded, for example, to the actuating piston 48 or connected to it by some other suitable method.

Figure 3:
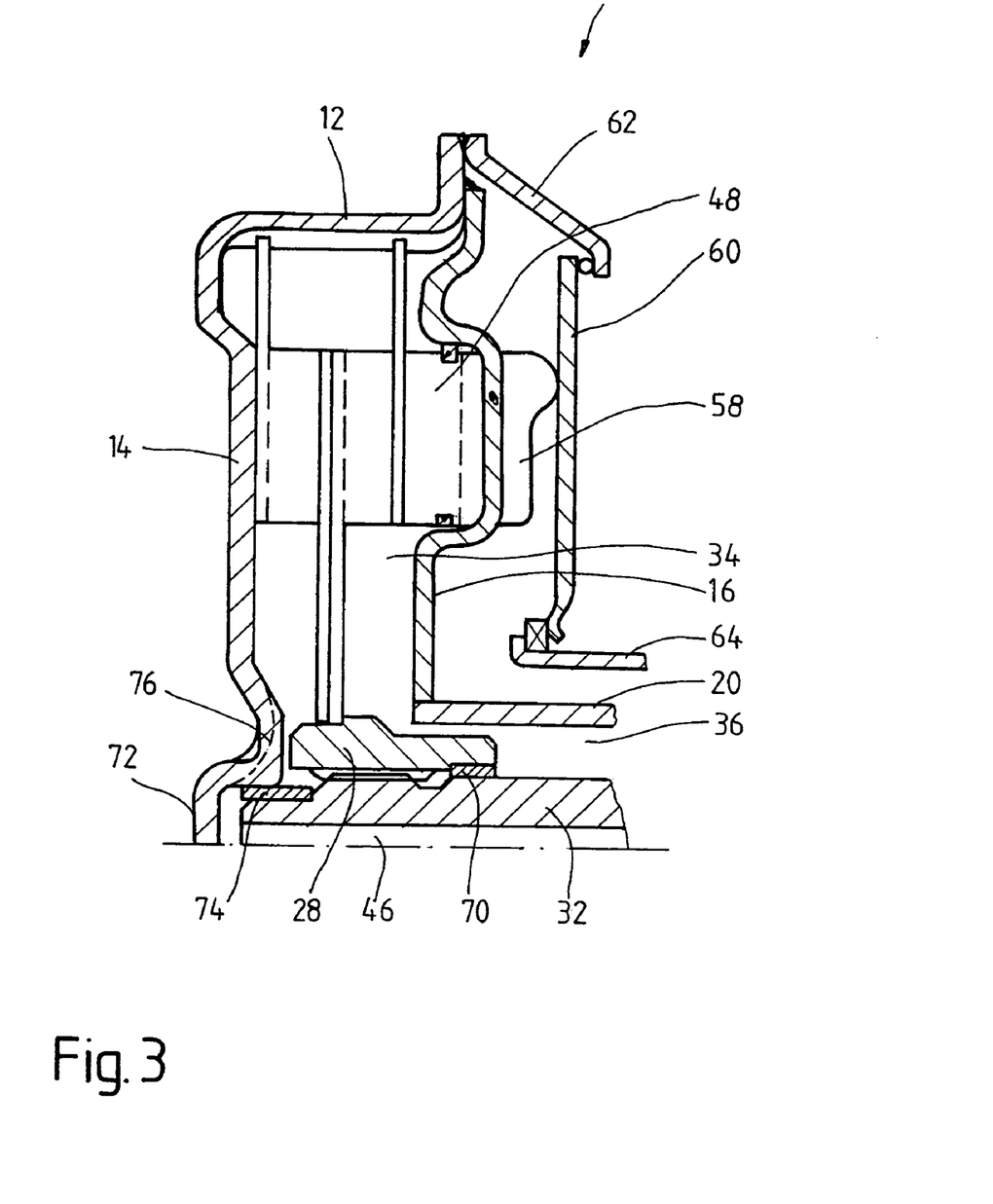
FIG. 3 show another view, corresponding to FIG. 1, of a modification of the embodiment shown in FIG. 1.

FIG. 3 shows an embodiment of the clutch arrangement 10 according to the invention, in which the takeoff hub 28 is supported radially on the takeoff shaft 32 and possibly also in the axial direction by a bearing 70. Especially when this bearing 70 is again designed as a plain bearing element, it can simultaneously fulfill the previously mentioned sealing function, so that the fluid supplied via the space 36 arrives in a defined manner in the interior space 34.

The radially inner area of the housing part 14 of the housing arrangement 12 has a cup-like recess 72 by which it is also supported on the takeoff shaft 32, at least in the radial direction, by way of an additional intermediate bearing 74. Here, too, the bearing 74, which is designed as, for example, a plain bearing ring, can again provide a sealing function, so that the fluid leaving the interior space 34 can arrive in the central opening 46 in the takeoff shaft 32 by way of fluid flow areas 76 formed by shaping the housing 14. Here, too, of course, the fluid can also flow in the opposite direction.

Clutch arrangements according to the invention are described below with reference to FIGS. 4 and 5. In these arrangements, the way in which the engaging and disengaging operations are carried out is based on a different functional principle. Components which correspond to those described above with respect to design or function are designated by the same reference numbers plus the letter "a".

Figure 4:
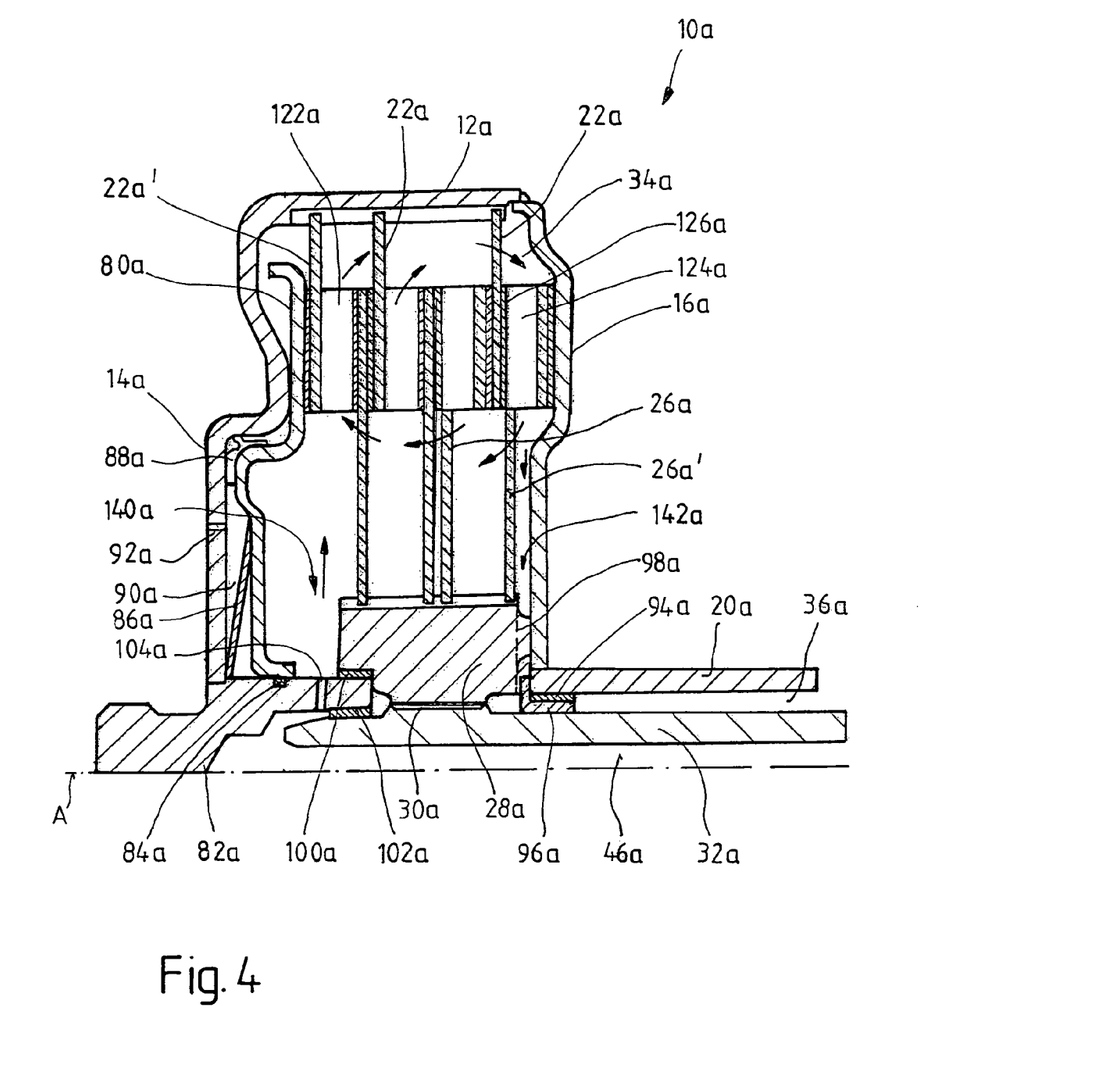
FIG. 4 shows another partial longitudinal cross section through a clutch arrangement according to the invention.

In the clutch arrangement 10a shown in FIG. 4, a ring-like actuating piston 80a is provided in the housing arrangement 12a. The radially inner end of this piston is mounted on the drive hub 82a by way of an intermediate sealing element 84a, so that it can move in a fluid-tight manner in the direction parallel to the axis of rotation A. In its radially outer area, the actuating piston 80a actuates the disks 22a, 26a, pressing them against each other and against the housing arrangement 12a in order to engage the clutch. An energy-storage device 86a, designed again, for example, as a diaphragm spring or plate spring, is provided between the radially inner area of the housing part 14a and the actuating piston 80a. The pretensioning action of this device presses the actuating piston 80a against the disks 22a, 26a and thus ensures that the clutch arrangement 10 is always in an engaged state in which all of the clutch torque can be transmitted. A sealing element 88a is provided between the housing part 14a and the actuating piston 80a. This element has the effect of creating an additional space 90a, which is bounded essentially by the housing part 14a and by the actuating piston 80a and which, in the embodiment shown here, also contains the energy-storage device 86a. This space 90a is connected to the outside by one or more vent openings 92a.

The housing arrangement 12a is supported radially on the takeoff shaft 32a by a bearing 94a, designed, for example, as a plain bearing bush. The bearing 94a can have a radially outward-projecting flange-like section, which simultaneously serves to provide the takeoff hub 28a with axial support against the housing arrangement 12a. So that, again, fluid can be supplied via the space 36a to the interior space 34a and also discharged, the bearing 94a preferably has pass-through areas 96a distributed around the circumference. The fluid can then reach the interior space 34a by passing through the space 36a, through the pass-through areas 96a, and through the pass-through areas 98a formed at least at some points on the circumference of the takeoff hub 28a.

In its end area near the engine, the takeoff hub 28a is rotatably supported on the housing hub or drive hub 82a by a bearing 100a, designed here again, for example, as a plain bearing bush. This housing hub 82a is supported radially and preferably also axially on the takeoff shaft 32a by an additional bearing 102a, also designed as, for example, a plain bearing bush. The housing hub 82a has pass-through openings 104a at several points on the circumference, through which fluid can pass from the interior space 34a to the central opening 46a in the takeoff shaft 32a. Especially when the bearings 100a, 102a are in the form of plain bearing bushes, they also serve simultaneously to prevent any significant amount of leakage from occurring from this space into the space 36a via the wedge-shaped set of teeth 30a.

It can be seen from the preceding description that, in the design shown in FIG. 4 and also in the design variants described in conjunction with FIG. 1, the fluid can be made to flow in the desired direction. For example, the flow direction can be adapted to the operating mode; i.e., it can be made to depend on whether the system is operating in push mode or in pull mode.

In the case of the embodiment shown in FIG. 4, the fluid pressure is increased to disengage the clutch, this increase in pressure being produced by a corresponding increase in the fluid supply. As a result of the elevated pressure in the interior space 34a, the actuating piston 80a is shifted axially against the pretensioning effect of the energy-storage device 86a, so that the force which is pressing the friction elements or disks 22a, 26a against each other is at least reduced. As this pressure increases, the piston 80a shifts, and the displaced air can escape from the space 90a through the opening 92a. If these openings 92a are omitted, an additional force will be produced by the compression of the air, the effect of which will be to support the force-producing action of the energy-storage device 86a.

It is again unnecessary in the case of the embodiment shown in FIG. 4 to make available an additional fluid line through which pressure fluid serving only to shift the actuating piston is supplied or discharged. Instead, through appropriate adjustment of the pressure relationships, the fluid which flows through the interior space 34a for the sake of cooling is alone sufficient to shift the actuating piston 80a and thus to switch between the engaged and the disengaged state.

Figure 5:
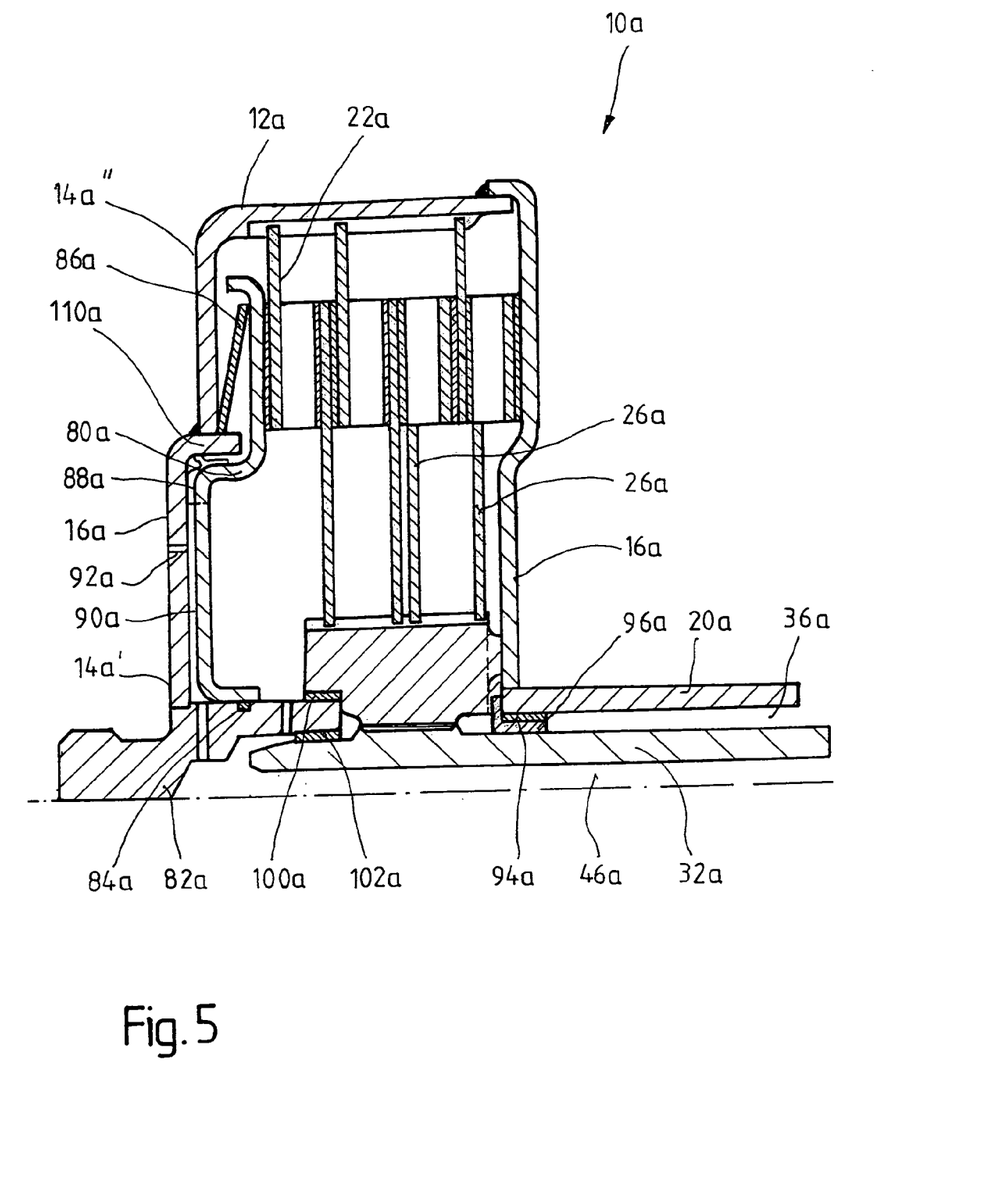
FIG. 5 shows a view, corresponding to FIG. 4, of an alternative embodiment of the clutch arrangement according to the invention.

The embodiment shown in FIG. 5 differs from that according to FIG. 4 essentially in that the energy-storage device 86a is no longer in the space 90a. It has been shifted radially outward and is now active in the area in which the actuating piston 80a acts on the disks 22a, 26a, which serve as friction elements. So that the energy-storage device 86a can be centered, the housing part 14a can consist of two parts. An inner section 14a', formed essentially like a cup, is connected to the housing hub 82a; and an outer section 14a", also essentially in the form of a cup, is connected to the essentially cylindrical part 110a of the section 14a'. At the connection site, the cylindrical section 110a projects slightly into the interior of the housing arrangement 12a, as a result of which a ring-like centering surface is provided for the energy-storage device 86a.

Figure 6:
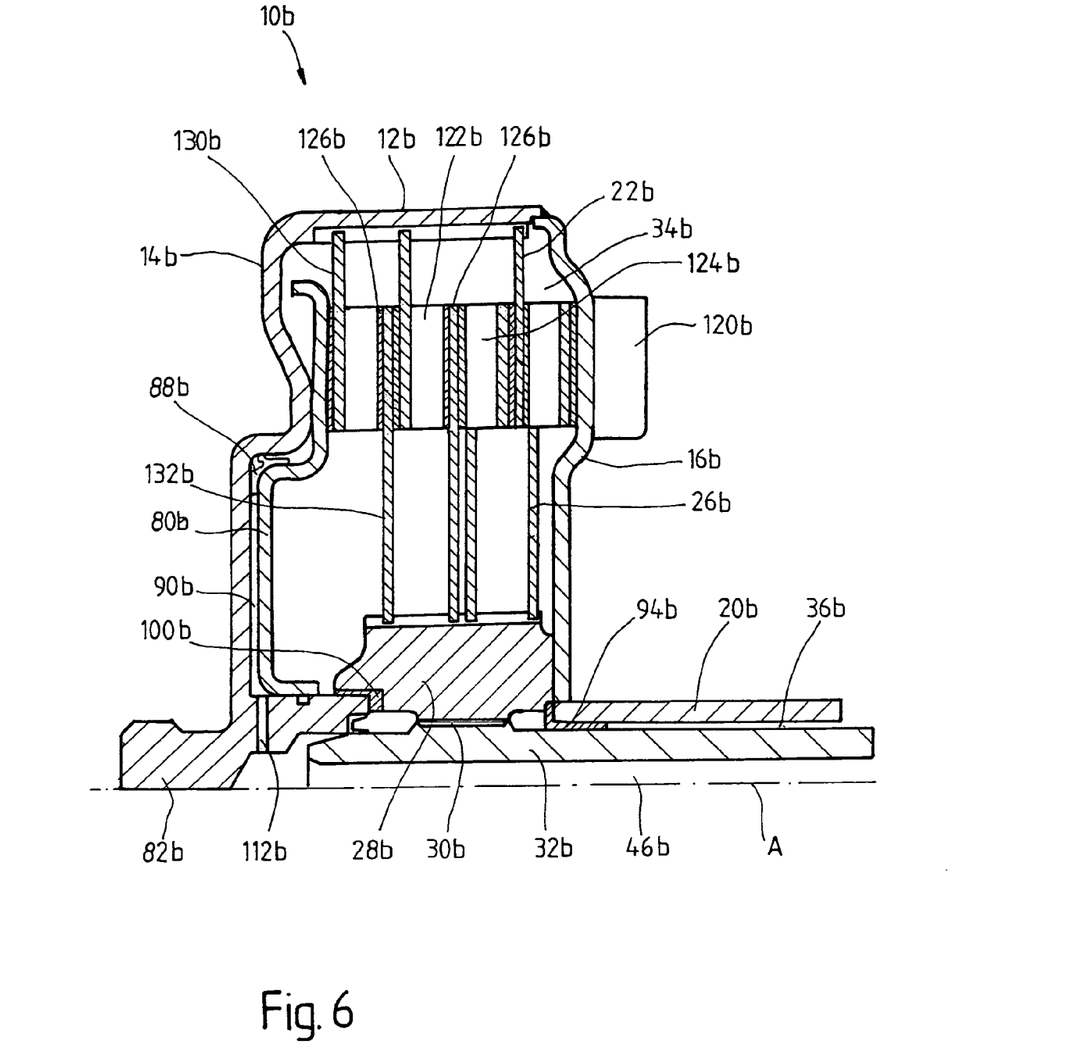
FIG. 6 shows another partial longitudinal cross-sectional view of a clutch arrangement according to the invention.

Another embodiment of a clutch arrangement according to the invention is shown in FIG. 6. Components which correspond to those described previously with respect to design or function are designated by the same reference numbers plus the letter "b".

In the embodiment shown in FIG. 6, the interior space 34b of the housing arrangement 12b, in which the friction elements or disks 22b, 26b are positioned and operate, is sealed in an essentially fluid-tight manner by the two bearings 94b, 100b, designed here again, for example, as plain bearing bushes. It should be pointed out that the fluid-tight seal could obviously also be accomplished here by other types of sealing elements not serving simultaneously both axial and radial support functions. The interior space 34b is thus essentially completely sealed off against the supply or discharge of fluid, so that corresponding lines serving to supply the interior space 34b with fluid do not have to be provided. In the housing hub or drive hub 82b, openings 112b are provided, which lead into the space 90b, formed between the actuating piston 80b and the housing part 14b. The fluid pressure in the space 90b can be increased by increasing the supply of fluid being sent through the central opening 46b in the takeoff shaft 32b. Especially if the interior space 34b has not been completely prefilled with fluid and there is therefore still a certain residual volume of air present in it, the movement of the actuating piston 80b in the axial direction to bring the disks 22b, 26b into a torque-transmitting state of frictional interaction will have the effect of compressing this residual air. When the fluid pressure in the space 90b is lowered or released, the expansion of the air previously compressed in the interior space 34b will restore the actuating piston 80b to its original position.

Figure 7:
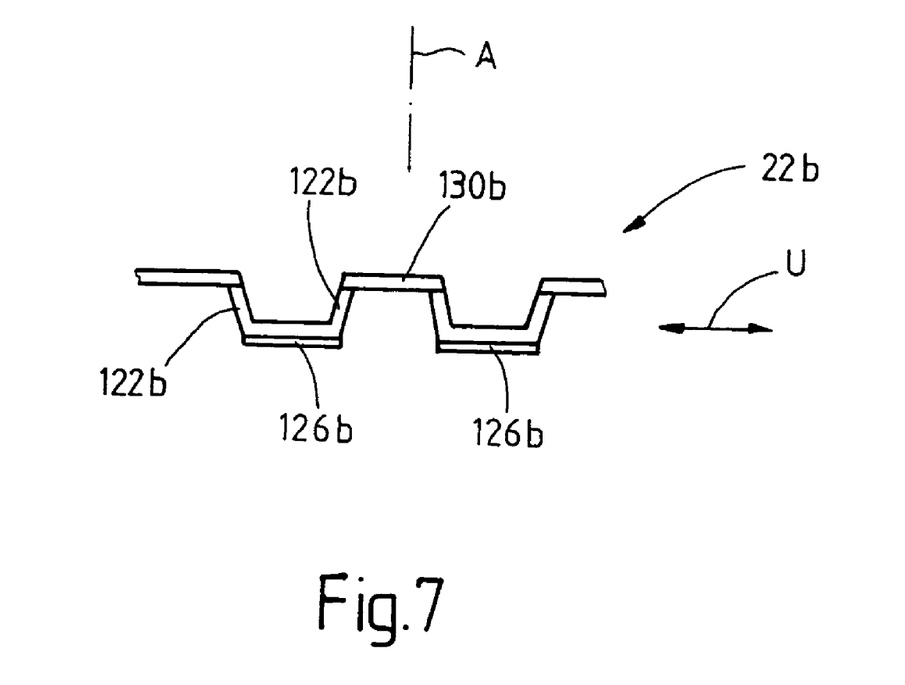
FIG. 7 shows a view of a circumferential section of a disk-like friction element, seen radially from the outside.

It can therefore be seen in principle that, even in this embodiment, only a single fluid line is required. But because there are no lines present through which the fluid which has been heated in the interior space 34b by slippage can be exchanged, other measures are taken to ensure that excessive heating cannot occur. Thus, for example, cooling fins 120b can be provided on the outside surface of the housing arrangement 12b to increase the surface area by which heat can be dissipated. Structured or jagged component surfaces can also increase the rate at which heat is dissipated. In the clutch arrangement 10b, furthermore, it is preferable for at least some of the disks 22b, 26b to be designed in such a way that, during rotational operation, and especially when the clutch is slipping, i.e., when the rpm's of the disks 22b are different from those of the disks 26b, the fluid is caused to circulate in the interior space 34b. For this purpose, fluid transport areas 122b, 124b can be provided on the disks 22b, 26b. These areas can be sections which extend radially outward from the radially inner area and have at least one dimensional component extending in the axial direction. When the clutch is rotating, these sections cause the fluid to circulate. For example, the frictionally active sections of the disks 22b, 26b, which can, for example, carry friction linings, can be designed in the form of rings, and the sections of the circumference which carry the friction linings 126b can be offset axially and in the circumferential direction U from the sections 130b, 132b, which extend radially outward or radially inward to engage for rotation in common with the various components. The previously mentioned fluid transport areas 122b, 124b are thus present between these two sections, which follow each other in the circumferential direction U and which are axially offset from each other, so that, as indicated in FIG. 7, the disks 22b, 26b acquire an undulating form in the circumferential direction U. If there is an rpm differential present and the clutch is therefore slipping, these fluid transport areas 122b, 124b will operate in the manner of a pump-turbine system and force the fluid to circulate primarily around the frictionally active surface areas. It should be pointed out here that a detailed description of various ways in which these disks cam be designed to produce fluid circulation can be found in U.S. Pat. No. 6,910,561.

In an embodiment such as that described above in conjunction with FIG. 6, it is also possible, after the clutch has been completely engaged, i.e., after there is no longer any difference in rpm's between the input side and the output side, for a state to develop in which an excessive temperature is reached in the area of the clutch arrangement 10b, e.g., a state in which the temperature of the fluid present in the interior space 34b is too high, such states occurring especially after a prolonged phase of slippage. In accordance with another aspect of the present invention, the fluid pressure in the space 90b can be lowered to bring the clutch arrangement 10b into a state in which there is a small amount of slippage between the disks 22b and the disks 26b. Even very small differences in rpm's are sufficient to ensure that the previously described fluid circulation will become established and that the heat will be carried away primarily from the area which had been frictionally active beforehand. The cooling of the entire clutch arrangement can thus be improved. Once the temperature has fallen back down below a certain limit, the fluid pressure in the space 90b can be increased again to bring the clutch back into the completely engaged state. A safety measure is thus provided, which prevents accumulated heat from damaging the various components, especially the frictionally active disks 22b, 26b.

It is also conceivable in principle that the clutch arrangement 10 could be actuated in such a way that, when a transition to the completely engaged state is to occur, that is, a state in which there is no longer any difference between the rpm's of the various packages of disks, this completely engaged state is produced or allowed only if the previously mentioned temperature is not above a certain threshold or only after it has fallen below a certain threshold.

In the previously described methods, the degree of slippage which has been temporarily retained or restored in order to force the fluid to circulate is adjusted in such a way that the amount of heat dissipated from the frictionally active area by the fluid caused to circulate by the slippage, i.e., by the difference in rpm's, is greater than the frictional heat produced during the state of slippage. In general, only a very small degree of slippage will be allowed, because even a small amount of slippage which produces a comparatively small amount of frictional work is sufficient to produce a considerable amount of fluid circulation and thus to dissipate a considerable amount of heat.

It should be pointed out that, of course, some or all of the friction elements or disks described with respect to FIGS. 1–5 can also be designed to cause the fluid to circulate around the frictionally active surface areas when the clutch is slipping.

In the case of the embodiments described in conjunction with FIGS. 1–5, the effect of creating circulation in the frictionally active areas as described above with reference to FIGS. 6 and 7 can also be used in coordination with the flow direction, that is, the direction in which the fluid is supplied to the space containing the disks and then discharged from it again. This will be described below with reference to FIG. 4.

It is to be assumed here first that, during operation in pull mode, that is, in a state in which torque is being transmitted from the prime mover via the housing arrangement 12a to the disks 22a and from these to the disks 26a and the takeoff hub 28a, the working fluid is introduced into the interior space 34a via the central opening 46a in the shaft 32a and via the openings or bores 104a. It can be seen that, from an axial perspective, the working fluid is supplied to an area where a disk 22a' and its fluid transport areas 122a are present, this disk being connected nonrotatably to the housing arrangement 12a. In a corresponding manner, a disk 26a', which is connected nonrotatably to the takeoff hub 28a, and its fluid transport areas 124a are located in the axial area in which the hydraulic fluid leaves the interior space 34a in the radially inward direction and enters the space 36a. When, during this state of pull, there is an rpm differential, which, in pull mode, means that the disks 22a are rotating faster than the disks 26a, the fluid transport areas 122a of the disks 22a act as a pump arrangement, by means of which the circulating fluid is transported radially outward. In contrast, the fluid transport areas 124a of the slower-turning disks 26a act as a turbine arrangement, which deflects or conveys the fluid radially inward. It can be seen from this that, when the clutch is in pull mode and is also slipping, a radially outward-directed fluid flow is also induced by the fluid transport areas 122a, namely, in the axial area in which the fluid is introduced radially inward into the interior space 34a through the openings 104a. The incoming fluid, which is cooler, is flowing in same direction as the flow induced by the transport areas and is therefore taken up directly by this induced fluid flow. There is therefore no collision between the fluid being introduced in the radially outward direction into the interior space 34a and the fluid caused to circulate by the fluid transport areas 122a. In a corresponding manner, the radially inward transport of fluid in the area in which the fluid is leaving the interior space 34a in the radially inward direction has the effect of supporting this departure.

When the drive system changes into a state of push-mode operation, in which the disks 22a are rotating more slowly than the disks 26a, fluid will be conducted radially inward by, for example, the disk 22a', which then, together with the other disks 22a and their fluid transport areas 122a, will act as a turbine arrangement. In this state, the fluid flow direction according to the invention will be reversed, so that the fluid will now leave through the openings 104a and the central opening 46a in the shaft 32a. The fluid feed now takes place via the space 36a at the other axial end of the takeoff hub 28a, thus in an axial area in which now the disk 26a' with its fluid transport areas 124a is acting as a pump arrangement and is conveying fluid radially outward from the radially inner area.

It can be seen from the preceding description that fluid inlet/outlet areas are formed at both axial ends of the takeoff hub 28a, i.e., by the openings 104a on one side and by the openings or recesses 96a, 98a on the other side. Depending on whether the system as a whole is operating in pull mode or push mode, an inlet/outlet area can be used either as a fluid feed area or as a fluid discharge area by supplying the fluid either through the central opening 46a or through the space 36a.

Given this aspect of the present invention, according to which, therefore, the fluid is introduced into the interior space of the housing arrangement in the axial area where the circulating fluid already has a radially outward-directed flow component, whereas the fluid leaving the interior space is in an axial area of the housing arrangement where the circulating fluid already has a radially inward-directed flow component, the fluid can be supplied and discharged in a manner which not only does not interfere with the fluid circulation responsible for the cooling effect but actually supports it.

It should be pointed out here that the various areas discussed above do not have to be in perfect axial alignment. Even only a rough alignment of the points where the fluid is supplied and removed with the areas in which the flow proceeds essentially radially outward or radially inward is advantageous in terms of obtaining the effect discussed above.

The present invention provides various measures which, although simple in nature, ensure both that the frictionally active areas can be adequately cooled and that the various components can be actuated as required. In any case, however, it is possible to simplify the design measures required to supply and to remove the working fluid.

What is claimed is:

1. A clutch arrangement for a motor vehicle, the arrangement comprising:
    a housing mounted for rotation and containing a space which can be filled with a fluid;
    at least one first friction element in said space and connected to said housing for rotation in common with said housing, said first friction element having a frictionally active area;
    at least one second friction element in said space which can be connected to a takeoff shaft for rotation in common with said takeoff shaft, said second friction element having a frictionally active area which engages said frictionally active area of said at least one first friction element;
    fluid transport areas on at least one of said friction elements for producing a circulation of fluid around at least some of said frictionally active areas;
    a fluid inlet for introducing said fluid into said space;
    a fluid outlet for discharging said fluid from said space; and
    an energy storage device which applies a pretensioning force for pretensioning said first and second friction elements in frictional engagement;
    a ring-like actuating element slideably received in a fluid-tight manner in said housing for transmitting said pretensioning force between said energy storage device and said friction elements; and
    a plurality of force transmitting sections passing through said housing between said energy storage device and said actuating element.

2. The clutch arrangement of claim 1, wherein said pretensioning force can be opposed by fluid pressure in said space.

3. The clutch arrangement of claim 1, wherein at least one of said friction elements comprises a friction lining on said frictionally active area, said fluid transport areas extending radially and having at least one dimensional component extending axially away from said friction lining.

4. The clutch arrangement of claim 1, further comprising an actuating mechanism for actuating said energy storage device to perform clutch-release operations.

5. A clutch arrangement for a motor vehicle, the arrangement comprising:
    a housing mounted for rotation and containing a first space and a second space which are at least partially filled with a fluid, said first space being sealed against fluid exchange;
    at least one first friction element connected to said housing for rotation in common with said housing, said first friction element being located in said first space and having a frictionally active area;
    at least one second friction element connected to a takeoff shaft for rotation in common with said takeoff shaft, said second friction element being located in said first space and having a frictionally active area which engages said frictionally active area of said at least one first friction element;
    fluid transport areas on at least one of said friction elements for producing a circulation of said fluid around at least some of said frictionally active areas; and
    an actuating element which can be actuated by a supply of fluid to said second space to produce a frictional interaction of said friction elements in said first space, wherein said actuating element releases said friction elements into a state of slippage when said friction elements are engaged slip-free and a temperature in said first space exceeds a predetermined limit, and/or wherein said actuating element prevents said friction elements from being engaged slip-free when a temperature in said first space is above a predetermined limit.

6. The clutch arrangement of claim 5, wherein at least one of said friction elements comprises a friction lining on said frictionally active area, said fluid transport areas extending radially and having at least one dimensional component extending axially away from said friction lining.

7. A clutch arrangement for a motor vehicle, the arrangement comprising:
    a housing containing a space which is at least partially filled with a fluid, said space comprising an axial area in which said fluid has a radially outward directed flow component and an axial area in which said fluid has a radially inward directed flow component;
    at least one first friction element connected to said housing for rotation in common with said housing, said first friction element being located in said space and having a frictionally active area;
    at least one second friction element connected to a takeoff shaft for rotation in common with said takeoff shaft, said second friction element being located in said space and having a frictionally active area which engages said frictionally active area of said at least one first friction element;
    fluid transport areas on at least one of said friction elements for producing a circulation of said fluid around at least some of said frictionally active areas;
    a fluid inlet for introducing fluid into said space; and
    a fluid outlet for discharging fluid from said space;

wherein at least one of said fluid inlet and said fluid outlet is axially aligned with one of said friction elements incorporating said fluid transport areas, wherein fluid can be introduced by said fluid inlet into said axial area in which said fluid has a radially outward directed flow component, and fluid can be discharged by said fluid outlet from said axial area in which said fluid has a radially inward directed flow component, and wherein, when one of said friction elements incorporating said fluid transport areas is rotating at a higher speed than said other friction element, said fluid inlet axially aligned with said friction element rotating at a higher speed introduces fluid into said space, and when one of said friction elements incorporating said fluid transport areas is rotating at a lower speed than said other friction element, said fluid outlet axially aligned with said friction element rotating at a lower speed discharges fluid from said space.

8. The clutch arrangement of claim 7, wherein said fluid inlet and said fluid outlet are radially inside said frictionally active areas of said friction elements.

9. The clutch arrangement of claim 7, wherein at least one of said friction elements comprises a friction lining on said frictionally active area, said fluid transport areas extending radially and having at least one dimensional component extending axially away from said friction lining.

* * * * *